(12) United States Patent
Heikkinen

(10) Patent No.: US 10,492,035 B2
(45) Date of Patent: Nov. 26, 2019

(54) GROUP COMMUNICATION APPARATUS AND GROUP COMMUNICATION METHOD

(71) Applicant: SuitsYou Design Oy, Espoo (FI)

(72) Inventor: Mika Heikkinen, Espoo (FI)

(73) Assignee: SuitsYou Design Oy, Espoo (FI)

( * ) Notice: Subject to any disclaimer, the term of this patent is extended or adjusted under 35 U.S.C. 154(b) by 71 days.

(21) Appl. No.: 15/736,824

(22) PCT Filed: Jun. 17, 2016

(86) PCT No.: PCT/FI2016/050439
§ 371 (c)(1),
(2) Date: Dec. 15, 2017

(87) PCT Pub. No.: WO2016/203115
PCT Pub. Date: Dec. 22, 2016

(65) Prior Publication Data
US 2018/0367959 A1    Dec. 20, 2018

(30) Foreign Application Priority Data

Jun. 17, 2015 (FI) ...................... 20150179

(51) Int. Cl.
H04W 4/08 (2009.01)
H04W 76/14 (2018.01)
(Continued)

(52) U.S. Cl.
CPC ............ *H04W 4/08* (2013.01); *H04L 51/046* (2013.01); *H04L 51/20* (2013.01); *H04L 63/065* (2013.01); *H04L 67/1044* (2013.01); *H04M 1/7253* (2013.01); *H04W 4/12* (2013.01); *H04W 4/80* (2018.02); *H04W 76/11* (2018.02);
(Continued)

(58) Field of Classification Search
CPC ....................................... H04W 4/08
See application file for complete search history.

(56) References Cited

U.S. PATENT DOCUMENTS 7,826,877 B2 * 11/2010 Ortiz ...................... H04N 5/232
455/566
8,320,870 B2 * 11/2012 Cho ..................... H04B 1/3827
455/3.06
(Continued)

FOREIGN PATENT DOCUMENTS

BE          1011485 A6    10/1999
DE    202004000670 U1     5/2004
(Continued)

*Primary Examiner* — Ankur Jain
(74) *Attorney, Agent, or Firm* — Seppo Laine Oy

(57) ABSTRACT

A group communication apparatus and group communication method, which are intended for wireless communication between communication apparatuses belonging to a group, where the communication takes place via a database that has a connection to the Internet. The group communication apparatus searches for similar apparatuses in its vicinity and transmits the identifier of discovered apparatuses to the database over the Internet. The design or colouring of the group communication apparatus is characteristic of the group. The group can be for example a sports club, in which case the group communication apparatus notifies a success of the sports club in real time.

7 Claims, 7 Drawing Sheets

Figure 1A:
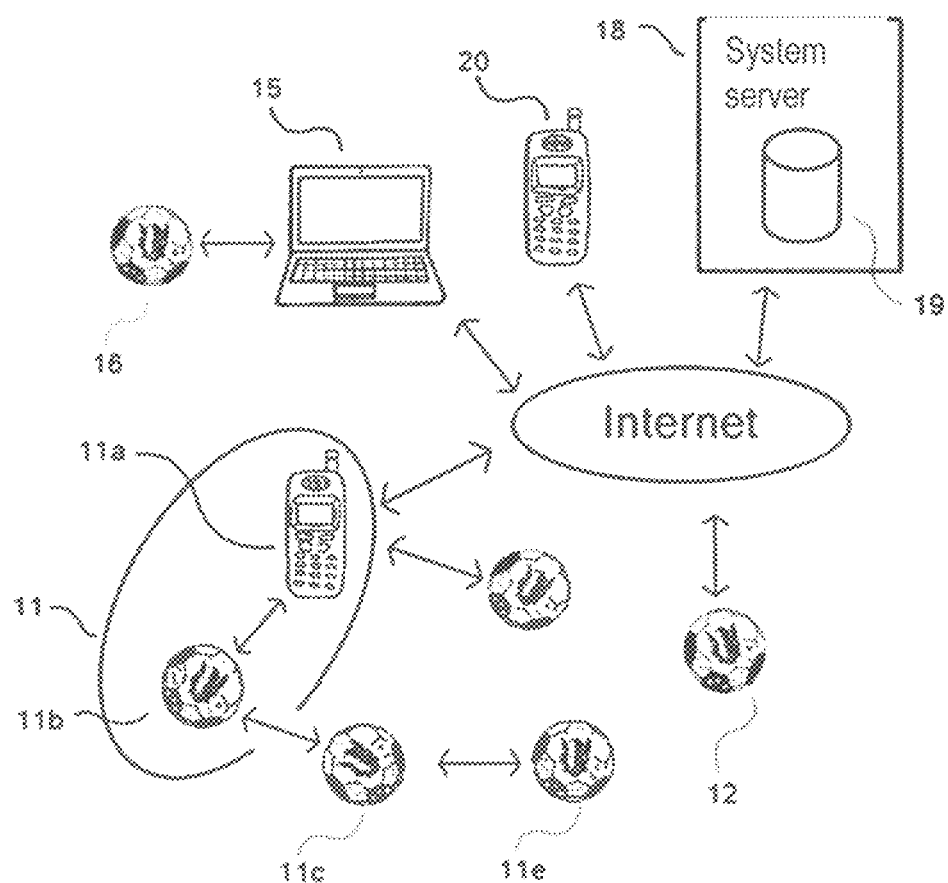

(51) Int. Cl.

| | | |
|---|---|---|
| *H04W 4/80* | (2018.01) | |
| *H04L 29/08* | (2006.01) | |
| *H04M 1/725* | (2006.01) | |
| *H04L 29/06* | (2006.01) | |
| *H04W 76/11* | (2018.01) | |
| *H04W 76/40* | (2018.01) | |
| *H04L 12/58* | (2006.01) | |
| *H04W 4/12* | (2009.01) | |
| *H04M 1/2745* | (2006.01) | |

(52) U.S. Cl.
CPC ........... *H04W 76/14* (2018.02); *H04W 76/40* (2018.02); *H04L 69/14* (2013.01); *H04L 69/18* (2013.01); *H04M 1/274516* (2013.01)

(56) References Cited

U.S. PATENT DOCUMENTS

2007/0263560 A1* 11/2007 Saarisalo .............. H04W 76/45
  370/328
2014/0213187 A1* 7/2014 Lee ........................... G01S 5/02
  455/41.2

FOREIGN PATENT DOCUMENTS

| EP | 2785089 A1 | 10/2014 |
|---|---|---|
| GB | 2360171 B | 5/2004 |
| WO | WO0217607 A1 | 2/2002 |
| WO | WO2009093148 A1 | 7/2009 |

\* cited by examiner

GROUP COMMUNICATION APPARATUS AND GROUP COMMUNICATION METHOD

BACKGROUND

The present invention relates to an apparatus and method for internal information exchange within a limited group, to the gathering of information from this limited group and to the transmission of real-time information on a public event.

Various user groups have a need to form groups for the internal communication and contacts of the same sphere of interest. Group communication services have several types of users, and they have different kinds of needs. As an example, the supporters of a sports club carry with them, especially when they participate in a sporting event, products provided with the emblems of the sports club they support. Many supporters wish to have information on a team and like to participate in a discussion concerning the team on the chat services and blogs available on the Internet. The most enthusiastic supporters often take part in ancillary events arranged by the club or the supporters themselves.

There are mobile phone applications available on the market for forming groups for communication. There are also various services available. As an example, the mobile phone may play a goal song when the team followed scores a goal (goal horn app).

Patent publication U.S. Pat. No. 8,320,870B2 presents an FM radio receiver integrated into a garment such as a cap or scarf. The radio receiver receives in real time a signal such as RDS data when the team followed has a significant turn in a match event, and generates a visible and audible indication of the turn. The garment contains the emblem of the sports team. The solution presented in the patent publication is a mere receiver, so it cannot send information on its user. It cannot be used for communication purposes, and a user is not transmitted information other than the events of the ongoing match.

Patent publication US20140213187A1 presents an acquisition method for place information based on a short-range radio. In it, a first Bluetooth terminal serves as an anchor. The purpose of the anchor is to search for other Bluetooth terminals in its vicinity and transmit an identifier of the found terminals to a place management server. The place management server gathers place information of each identifier. The place information can be used in marketing based on place. In the method presented, serving as an anchor, in other words searching for other Bluetooth terminals and transmission of identifiers, requires acceptance from the place management server. The method presented is particularly intended for use indoors, where the GPS of a mobile phone does not work.

Patent publication US20090221230A1 presents a method for the transmission of a video or audio recording made in a public event to a mobile communication device. Patent publication U.S. Pat. No. 7,826,877B2 presents a method for the transmission of video recordings made of the same sporting event to a mobile communication device.

Patent publication US20140213187A1 presents a method for the transmission of information between a mobile phone and a toy or between a toy and a toy. The toy reacts to the information by moving its extremities or by producing sound.

Publication BE 1011485 presents a cover made of a fabric material, to be placed over a mobile phone. The purpose of the cover is to protect the mobile phone or individualise a phone so that users do not confuse their phones with each other. The cover does not have functional properties and it does not affect the use of the phone.

Publication GB 2360171 describes a system and terminal for the arrangement of an interactive TV programme. In it, the surface material does not define the functionality of the system (terminal or server) or what information in the server can be accessed with the terminal. The device is not used for group communication.

None of the above-described solutions brings advantages to all types of users mentioned. The intention of the apparatus according to the present invention is to accomplish a method and apparatus, with which the advantages of group communication to the various parties can be improved.

SUMMARY OF INVENTION

The invention has been defined by the characteristics of the independent claims. Some specific embodiments have been presented in the dependent claims.

According to a first characteristic of the invention, a system for the forming of group communication between communication devices belonging to a group comprises:

at least one device serving as a group communication apparatus, at least one device serving as a system server, where at least the device serving as a group communication apparatus comprises a radio unit for establishing a wireless connection at least to the device serving as a system server, and at least one visually identifiable identifier unit, which is connectable to the device serving as a group communication apparatus, and the combination of the visually identifiable identifier unit and the device serving as a group communication apparatus comprises an identifier, which identifier is individual for the combination of the identifier unit and the device serving as a group communication apparatus or for a group, and by means of which identifier the device serving as a group communication apparatus can establish a connection to a group determined by the visual identifier at least via the device serving as a system server. According to a second characteristic of the invention, the group communication apparatus comprises a radio unit for establishing a wireless connection between at least one device serving as a group communication apparatus and at least one device serving as a system server, plus at least one visually identifiable identifier unit, which is connectable to the device serving as a group communication apparatus and comprises an identifier code, by means of which the device serving as a group communication apparatus establishes a connection to a group determined by the visual identifier at least via the device serving as a system server.

According to a third characteristic of the invention, the visually identifiable unit of the group communication apparatus comprises a memory element, into which memory element an identifier has been saved, which identifier is individual for the group communication apparatus or group and which identifier enables information transmission between the system server and the group communication apparatus.

According to a fourth characteristic of the invention, the visually identifiable unit of the group communication apparatus and the unit serving as a group communication apparatus have information transmission equipment for establishing a connection for the reading of an identifier, and the visually identifiable unit of the group communication apparatus is fastenable to a body part in a detachable manner or the visually identifiable unit of which group communication apparatus is physically separate from the body part.

According to a fifth characteristic of the invention, at least the device serving as a group communication apparatus has been formed as an application of a mobile communication device such as a mobile phone or tablet.

According to a sixth characteristic of the invention, the device serving as a system server has been formed as an application of a mobile communication device such as a mobile phone or tablet.

According to a seventh characteristic of the invention, at least one of the devices: device serving as a group communication apparatus or device serving as a system server comprises equipment for establishing a wireless Internet connection or equipment for establishing a wireless connection with a mobile communication device or with a communication device bound to a place.

According to an eighth characteristic of the invention, at least one of the devices: device serving as a group communication apparatus, device serving as a system server, mobile communication device or communication device bound to a place has been arranged to transmit a specific identifier determined by the visually identifiable unit of the group communication apparatus to a database, mobile communication device or communication device bound to a place, which database determines the group communication apparatuses belonging to a group.

According to a ninth characteristic of the invention, an identifier unit is accomplished for a group communication apparatus, which group communication apparatus comprises a radio unit for establishing a wireless connection between at least one device serving as a group communication apparatus and at least one device serving as a system server, plus at least one visually identifiable identifier unit, which is connectable to the device serving as a group communication apparatus and comprises an identifier, by means of which the device serving as a group communication apparatus establishes a connection to a group determined by the visually identifiable unit at least via the device serving as a system server, which visually identifiable identifier unit is fastenable to the unit serving as a group communication apparatus in a detachable manner in at least one of the following ways: as a surface material, guard or decoration.

According to a tenth characteristic of the invention, the method for accomplishing group communication between group communication apparatuses belonging to a group comprises:
at least one device serving as a group communication apparatus is provided,
at least one device serving as a system server is provided,
each comprising a radio unit for establishing a wireless connection between at least one device serving as a group communication apparatus and at least one device serving as a system server, and
at least one visually identifiable identifier unit is provided, which visually identifiable identifier unit is connected to a device serving as a group communication apparatus by means of an identifier code belonging to the identifier unit, by means of which identifier code a device serving as a group communication apparatus is used for establishing a connection to a group determined by the visual identifier at least via a device serving as a system server.

According to an eleventh characteristic of the invention, the disclosure of the visually identifiable identifier unit is performed automatically, and a group is joined either automatically or through the acceptance of a user.

By means of a twelfth characteristic of the invention, a group communication apparatus is accomplished, comprising:
a device serving as a group communication apparatus, which device serving as a group communication apparatus comprises a radio unit for establishing a wireless connection at least to a device serving as a system server, and
at least one visually identifiable identifier unit, which is connectable to a device serving as a group communication apparatus, and the combination of a visually identifiable identifier unit and a device serving as a group communication apparatus comprises an identifier, which identifier is individual for a device serving as a group communication apparatus or for a group, and by means of which identifier a device serving as a group communication apparatus can establish a connection to a group determined by the visual identifier at least via a device serving as a system server.

SHORT DESCRIPTION OF DRAWINGS

Figure 1B:
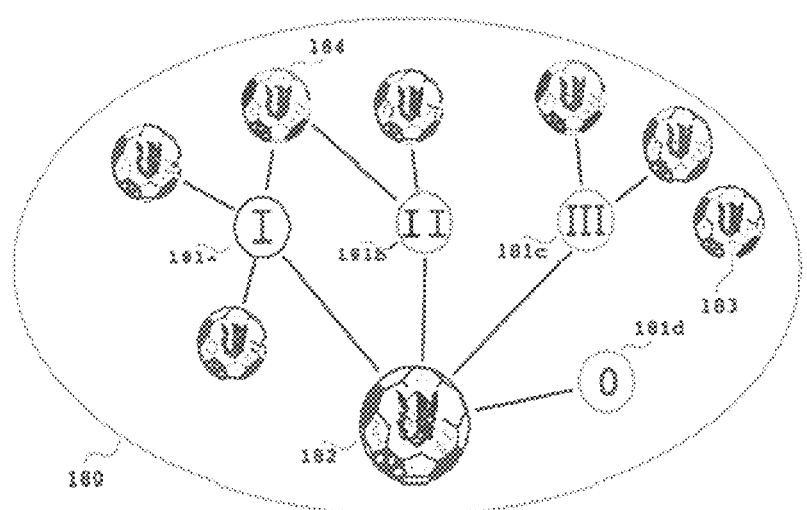
Figure 2A:
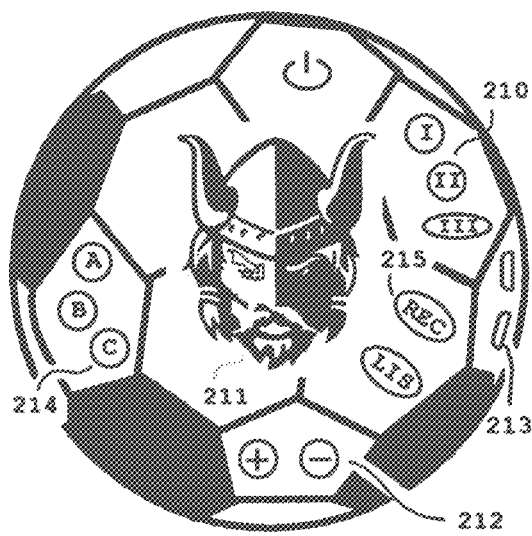
Figure 2B:
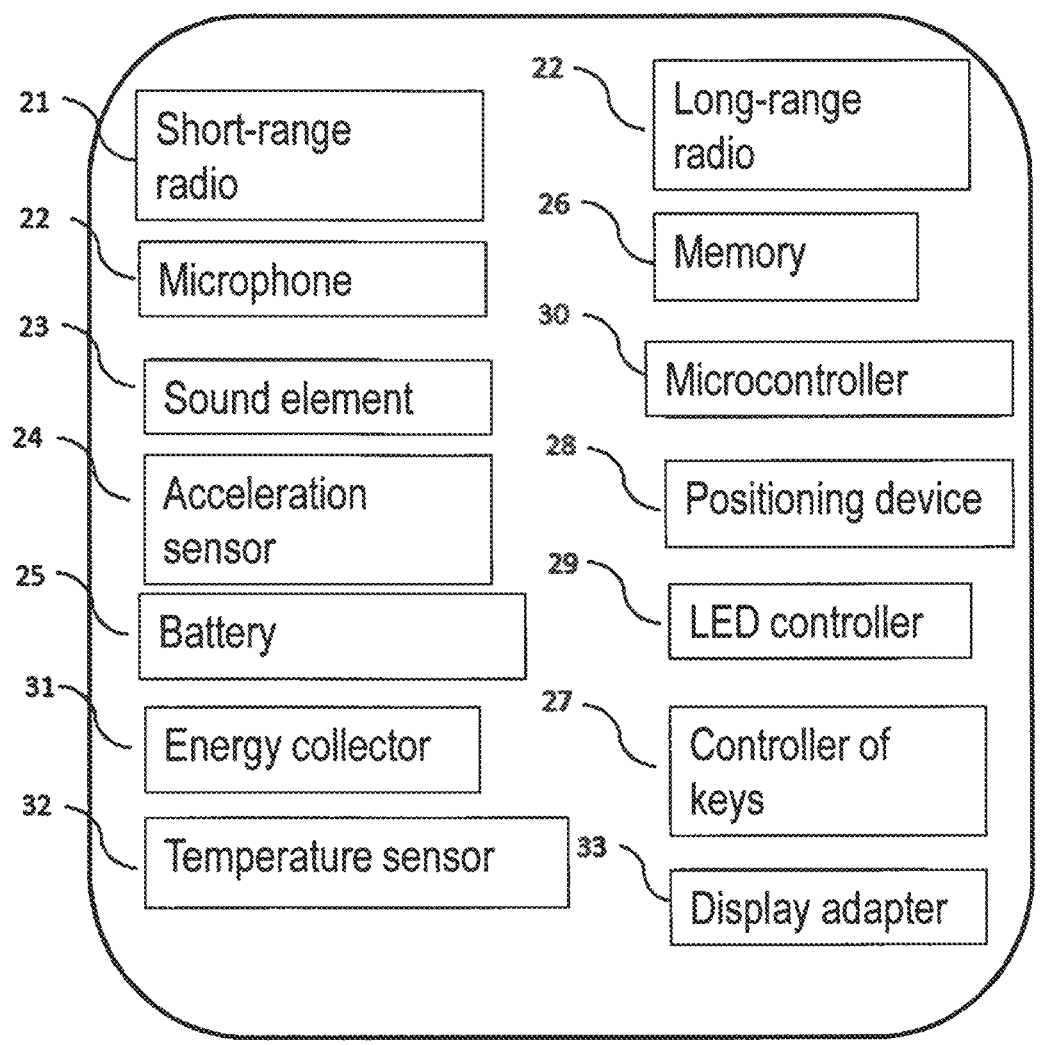
Figure 3:
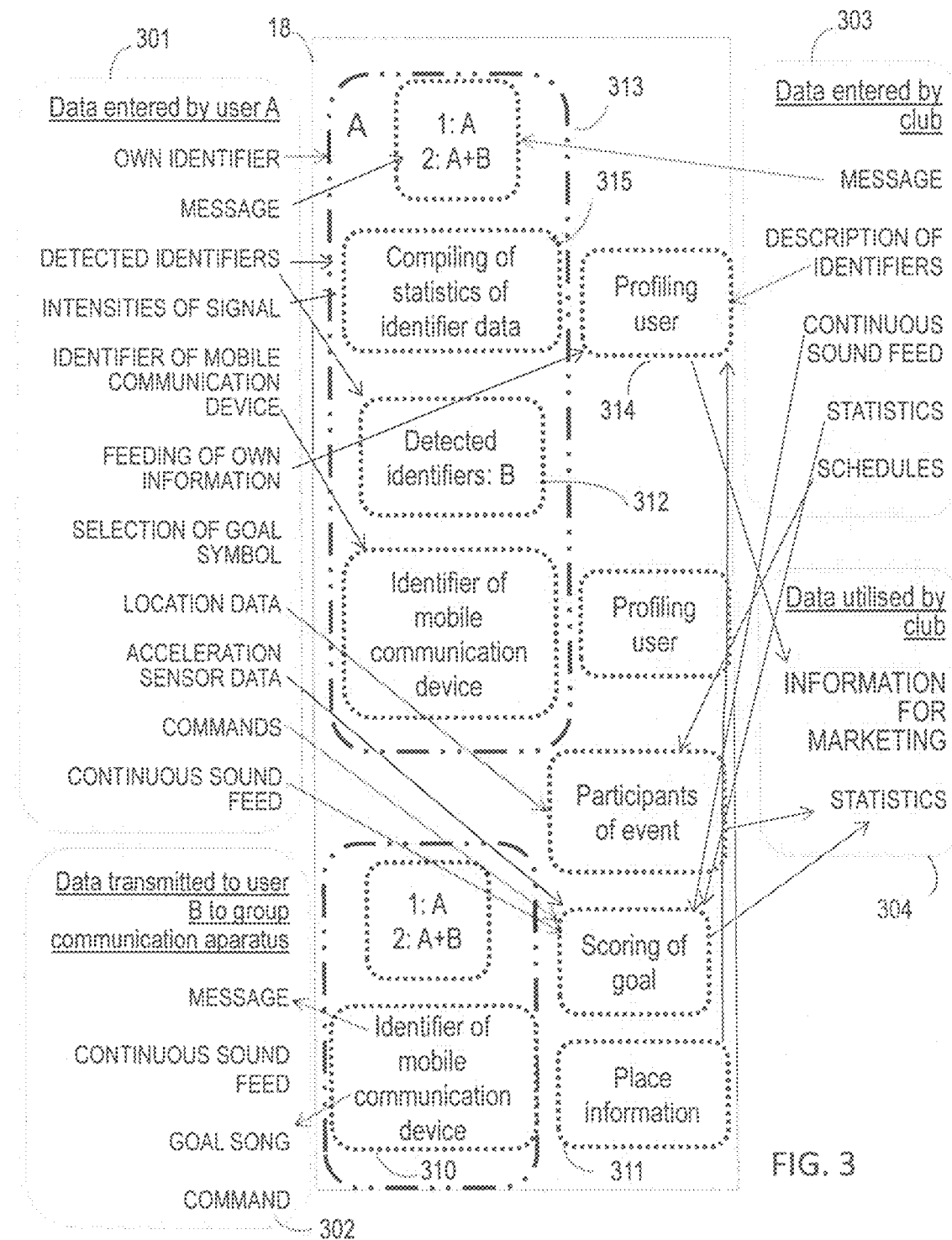
Figure 4:
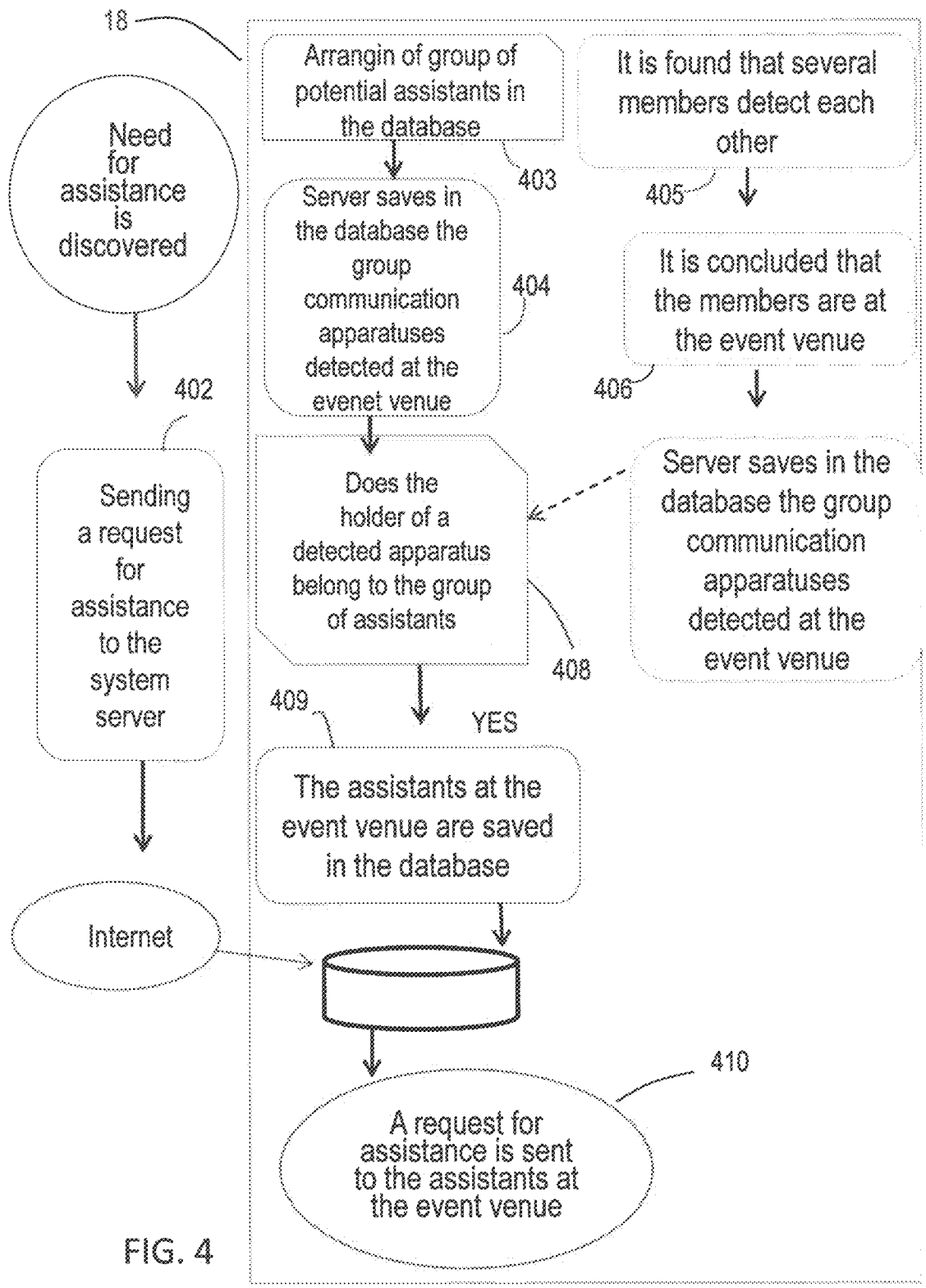
Figure 5:
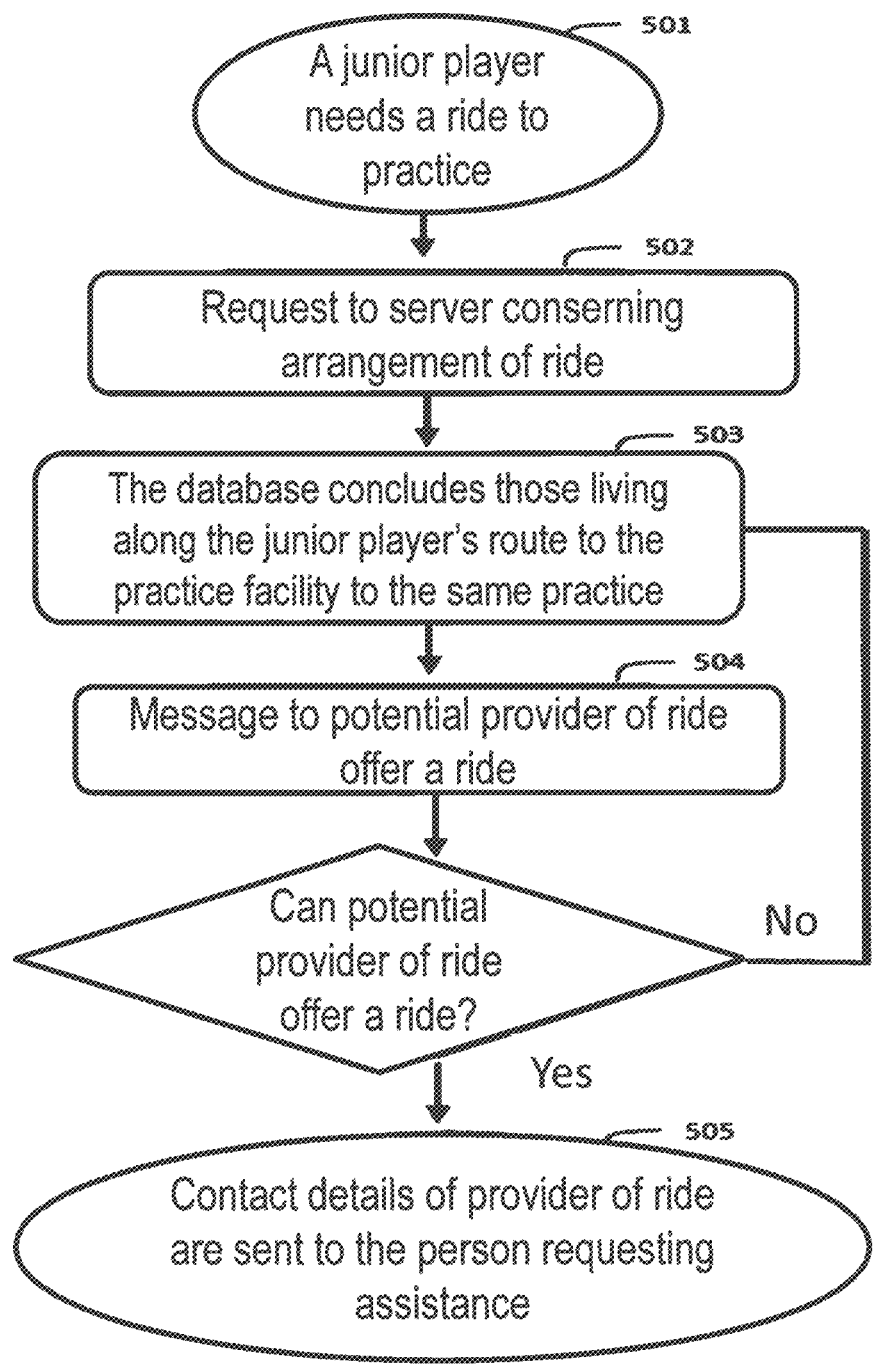
Figure 6:
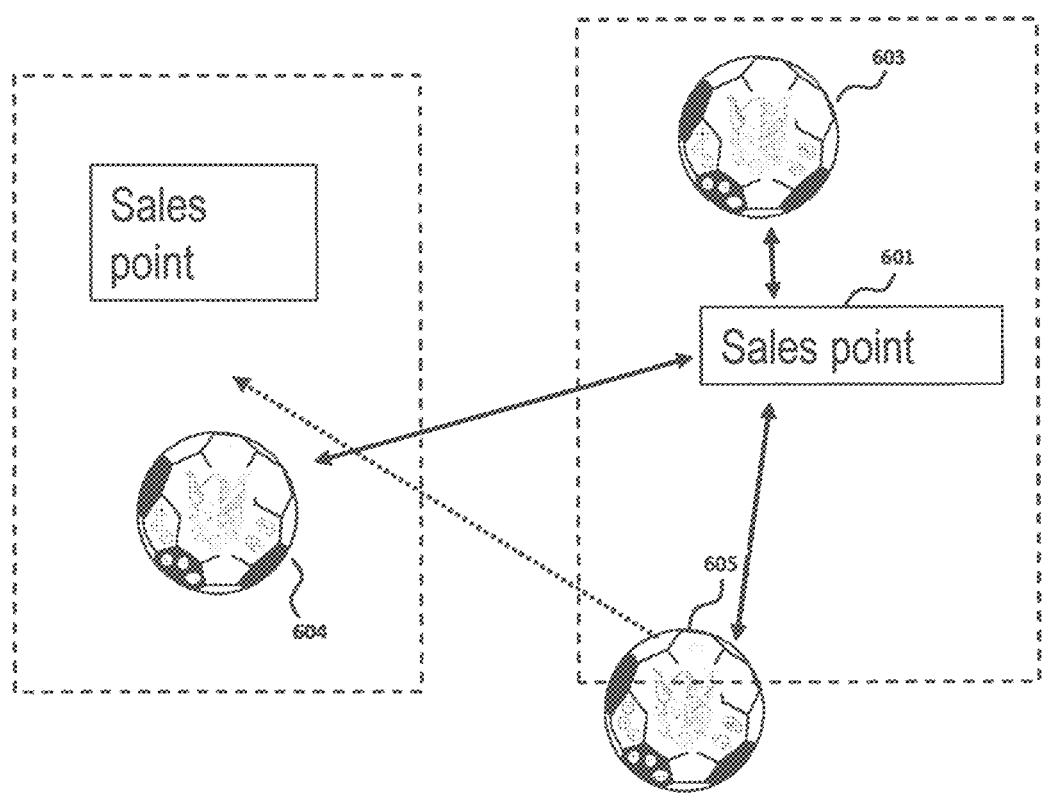

FIG. 1a shows various connection arrangements between a system server, the Internet, a mobile communication device establishing an Internet connection and group communication apparatuses according to at least some embodiments of the invention, FIG. 1b shows a group of a group communication apparatus and subgroups of the group according to at least some embodiments of the invention, FIG. 2a shows a user interface of group communication apparatuses according to some embodiments of the invention, FIG. 2b shows a block diagram of a group communication apparatus according to some embodiments of the invention, FIG. 3 shows information saved in a database, information read from a database and information produced by a database according to some embodiments of the invention, FIG. 4 shows in a flow chart the use of a group communication apparatus according to the invention in the arrangement of an event according to some embodiments of the invention, FIG. 5 shows in a flow chart the arrangement of a car ride for a junior player according to some embodiments of the invention, FIG. 6 shows an example of the interpretation of the intensity of a signal at a sales stand according to some embodiments of the invention, and

EMBODIMENTS

Definitions

In this context, limited group means a group of at least one user, most often several users, which group is limited by means of at least one criterion. A limited group can mean for example a sports team or individual athlete with background team and supporters, a musical ensemble or association with supporters, and a company and its customers. A group communication apparatus can also be used for communication within a community consisting of individual persons such as a group of friends or a school class, without an organisation at the background.

A user can be a person or community, company or equivalent.

A selection criterion is any criterion, which defines a condition for joining a group. A selection criterion can be simply the acquisition of an identifier, membership of a team or club, belonging to a team or acceptance by other members of the group.

A group communication apparatus is a combination of a visually identifiable identifier unit and a device serving as a group communication apparatus.

A device serving as a group communication apparatus is a separate functional body, a mobile communication device adapted for the purpose or equivalent.

The term "scoring a goal" is used to mean, alongside the scoring of a goal, any positive turn taking place in a match, such as a basket, point, run, in general the success of a team or the failure of the opponent.

The term "sports club" is used to mean the club of any sport, which club has supporters that follow the operation of the club or athletes that participate in the operation of the club.

The term "club" is used to mean the club of any event, which club has supporters that follow the operation of the club. A club can also mean a band or group engaged in performing arts, which club has followers. A club can mean an association, with people being interested in the operation of the association or with people participating in the operation of the association. A club can mean a company, with people being interested in the products or services of the company.

The term "group" is used to mean all supporters of a sports club. A group can also mean the players of a sports team or the players of a sports team who travel to practice using the same ride. A group can also mean a school group or day care centre group. A group can mean any specified group of people. A group consists of a limited quantity.

The term "subgroup" means a group composed of members belonging to the group, which subgroup does not necessarily include all members of the group.

The term "match" means any event of a club.

A visually identifiable unit is a unit which is distinguishable and identifiable on the basis of its external appearance as a member of a group comprising at least one such visually identifiable unit. In the description of the embodiments of the invention, a visually identifiable unit is referred to by the shorter term visual unit.

The term "identifier" means an electronically readable character string, which individualises a group or exchange of information with a system server. The character string can resemble a password or it can comprise an address to the system server of a group.

In this description, a sports club and sporting events are used as an illustration example. It is clear that the various embodiments of the invention can also be applied to other events, to other types of groups and to the forming of short-term, even non-recurring event groups or to the forming of long-term groups.

By means of some embodiments of a group communication apparatus according to the invention, it is possible to communicate with another group communication apparatus via a system server. If the group communication apparatuses are within the operating range of a short-range radio, communication is possible without a system server. The communication and transmission of information are possible with group communication apparatuses belonging to the same group. What is essential for belonging to the same group is the external appearance of the group communication apparatus, which external appearance is formed in some embodiments by a separate visually identifiable unit. The external appearance of the group communication apparatuses belonging to a first group advantageously differs from the external appearance of the group communication apparatuses belonging to a second group. In some cases the external appearance of each group communication apparatus can also be individually designed. The external appearance of a group communication apparatus is advantageously characteristic of a group. The messages are advantageously sound messages or streaming of sound. The sending of image-based, video-based and text-based messages is also possible, if external information input or output devices are connected to the apparatus.

A group communication apparatus can communicate either independently or, assisted by a mobile communication device, to a system server that has a connection to the Internet. In some embodiments the system server gathers to the database information on the users of the group communication apparatus and arranges information transmission between various users. While connected to the system server, the group communication apparatus transmits in some embodiments to the database of the system server its own identifier and the identifiers of other group communication apparatuses detected by it in its vicinity. The group communication apparatus can also gather other information such as place information and send the information gathered to the system server. In addition to an identifier, the apparatus can transmit to another corresponding apparatus also other information such as location information.

By means of the embodiments of the invention, it is possible to implement for example a fan product, which comprises a visible emblem of a sports club, which is why a supporter of the sports club wants to carry the apparatus often. The apparatus can also produce a team's goal song or support song, when a positive turn for the team takes place in a match event, such as the team scoring a goal. The apparatus according to the invention is easy to use and it has a simple user interface. The apparatus according to the invention is also inexpensive and durable. It is advantageously a soft toy, which a junior player of a sports club can keep for example on the zipper of a practice bag, whereby the apparatus always stays with the junior player. Because the apparatus according to the invention often stays with a user and because the apparatus has an individual identifier, the organisation of the sports club obtains utilisable information on the user of the apparatus. The organisation can utilise the information for example in marketing and in the drawing up of statistics concerning the practice activity of a junior player.

The apparatus also concretises a group consisting of an organisation and/or people, in which case the reproduction of the user right becomes more difficult, and when a user is logging in in the service, the user needs no password.

The needs of various types of organisations and other users can be responded to by means of the embodiments of the invention.

A sports club wishes to understand the behaviour and motives of the supporters of the sports club so that the sports club could allocate the marketing of products and services. A sports club also wishes to monitor the results of marketing. In events of a sports club, the apparatus can also be used for advertising or arranging services for a user. A sports club also wishes to increase the attachment and commitment of a supporter to a team.

In many cases, a junior player of a sports club does not own a phone or does not wish to carry one along, because there is a risk losing or breaking the phone.

The guardians of a junior player are often needed in assisting the arrangement of junior activities. The problem is often that the contact details of the guardians are not available, or it is not known which persons are present in a given event.

An artist can use the invention to communicate the completion of a work of art, or present works and their making in a focused manner to a potential clientele.

An entrepreneur or a group composed of entrepreneurs does not necessarily have a fixed place of operation, but the invention enables sales and marketing to a targeted group. Another entrepreneur can improve customer service by providing a customer with direct contact with service, sales or other services. In this case, the entrepreneur has information about the customer and customer's product.

An important characteristic of a group communication apparatus according to some embodiments of the invention is its visual appearance. The group communication apparatus can resemble the emblem of a sports club or musical ensemble, or it can be suggestive of for example an individual athlete, artist or trade mark. The visual appearance can also be designed by a user. The visual appearance tells a user the group with which the user can communicate using the group communication apparatus.

FIG. 1a shows some embodiments of the communication arrangements of a group communication apparatus according to the invention. A group communication apparatus 12 is equipped with a long-range radio 22 and software, which arrange a connection to a system server 18 without a mobile communication device. A user 11 has a mobile communication device 11a and group communication apparatus 11b. The mobile communication device is any portable device equipped with an Internet connection, such as a mobile phone or tablet. The Internet connection of the mobile communication device can be arranged by means of a mobile phone network or local area network such as wlan. The mobile communication device arranges the Internet connection, and uses application software to take care of the connection between the system server 18 and the group communication apparatus. The mobile communication device can take care of the connection of one or more group communication apparatuses to the system server. In FIG. 1, a user's 11 mobile communication device arranges the connection of the group communication apparatus 11b to the system server. The communication between the group communication apparatus 11b and the system server 18 includes at least the following stages:

the group communication apparatus 11b sends its own identifier to the mobile communication device 11a, the mobile communication device 11a transmits its own identifier and the identifier of the group communication apparatus 11b to a database 19 of the system server, the system server updates information on the group communication apparatus in the database 19 so that the information transmission of the group communication apparatus 11b is managed via the mobile communication device 11a.

The connection between the system server and the group communication apparatus takes place without a mobile communication device carried by a user or without a long-range radio included in the group communication apparatus, as follows:

the group communication apparatuses 11b and 11c detect each other and arrange a connection with each other using a short-range radio 21, and the group communication apparatus 11c sends its own identifier to the group communication apparatus 11b, the group communication apparatus 11b sends its own identifier and the identifier of the apparatus 11c to a mobile communication device 11a, the mobile communication device 11a transmits its own identifier and the identifiers of the group communication apparatuses 11b and 11c to the database of the system server, the system server updates information in the database so that the information transmission of the group communication apparatuses 11b and 11c is managed via the mobile communication device 11a.

In information transmission, the system server attaches to a message an address so that the devices transmitting the message—mobile communication device 11a and group communication apparatus 11b in the preceding example—transmit the message to the correct target. A group communication apparatus 11e invisible to the group communication apparatuses of a user 11 can communicate with the system server using the method described above, when the identifier of the group communication apparatus 11e has first been transmitted to the group communication apparatus 11c.

In the arrangement in accordance with FIG. 1a, the group communication apparatuses 11b, 11c and 11e can transmit information to each other without the information being recirculated via the system server.

The system can also include a device 15 bound to a place and having a connection to the Internet. It is possible that the location or other feature, such as purpose of use, of a device bound to a place has been saved in the database. The device 15 can also comprise a short-range radio unit, with which the device detects a group communication apparatus 16 in its vicinity. The device bound to a place can be a computer of an ice hockey club in an indoor ice rink used for practice, with the purpose of the computer being to take note of the players participating in a practice and to transmit the information on the participants to a database. On the other hand, a child can send a message from an indoor ice rink used for practice using the child's own group communication apparatus to a corresponding group communication apparatus of the child's guardian, transmitted by the computer.

The purpose of use of such device can be the monitoring or modification of information in the database. The information in the database can also be viewed and modified by means of a mobile communication device 20.

The example in FIG. 1b shows how a group 180 of a group communication apparatus can include subgroups formed of the members of a group. The subgroups can have one or more members, and the same person can be in several groups. FIG. 1b shows the subgroups selected by a user 182. The user has selected subgroups 181a, 181b and 181c to operate in the group communication apparatus. When a message is sent to the subgroup, all those who have joined the subgroup have access to the message. The subgroup 181d is only intended for communication between the system server and the user 182. A user 183 belonging to the same group does not belong to any of the groups to which the user 182 belongs, so they cannot send messages to each other. A user 184 belongs to the subgroups 181a and 181b. The group 180 can be composed for example of the supporters of the same football team, which users have bought a group communication apparatus. The group can comprise all holders of a similar group communication apparatus. The subgroups 181a-181d are formed in the database of the system server. The subgroups can be for example a subgroup concentrating on following some player of a football team, a subgroup composed of supporters living in the same area, or a subgroup assembled by a user from the other members of the group 180.

The example in FIG. 1*b* shows how a group 180 of a group communication apparatus can include subgroups formed of the members of the group. The subgroups can have one or more members, and the same person can be in several groups. FIG. 1*b* shows the subgroups selected by a user 182. The user has selected subgroups 181*a*, 181*b* and 181*c* to operate in the group communication apparatus. When a message is sent to the subgroup, all those who have joined the subgroup have access to the message. A subgroup 181*d* is only intended for communication between the system server and the user 182. A user 183 belonging to the same group does not belong to any of the groups to which the user 182 belongs, so they cannot send messages to each other. A user 184 belongs to the subgroups 181*a* and 181*b*. The group 180 can be composed for example of the supporters of the same football team, which users have bought a group communication apparatus. A group can comprise all holders of a similar group communication apparatus. The subgroups 181*a*-181*d* are formed in the database of the system server. The subgroups can be for example a subgroup concentrating on following some player of a football team, a subgroup composed of supporters living in the same area, or a subgroup assembled by a user from the other members of the group 180.

FIG. 2*a*1 shows some methods of implementation of the group communication apparatus. The group communication apparatus comprises a visually identifiable unit, an identifier associated with it and a body unit, which has at least equipment for communication. The body unit forms or is a device operating as a group communication apparatus. An identifier, with which the group communication apparatus forms a group, has advantageously been saved in the visually identifiable unit.

FIG. 2*a* shows a user interface according to some embodiments of the group communication apparatus according to the invention. The visually identifiable unit has been integrated into the body unit in a fixed manner. The device serving as a group communication apparatus comprises keys, which can be illuminatable. The keys are advantageously touch keys. The group communication apparatus can comprise function keys 215 used for determining what task the group communication apparatus is to perform. In the example of FIG. 2*a*, the function keys are used for selecting the activation of a recording or listening function. There can be function keys for other purposes, too, and their purpose can be set in the system server. A function key can be illuminated when the listening function is activated. When the recording or listening function has been selected, a key 210 is used for selecting the desired subgroup to which a recording is made or from which a message is listened. A key can comprise the name of a subgroup, or if a subgroup is composed of a single person, the key can comprise the name of that person. The key can become illuminated when a message has come for the subgroup in question. The group communication apparatus comprises command keys 214 used for giving a command to the system server. The group communication apparatus can comprise illuminatable numbered sections used for indicating the score of an ongoing match, or the group communication apparatus can become illuminated when a match of a team is beginning.

The group communication apparatus can be a fabric-covered soft toy, and the external appearance of the soft toy is advantageously individual for each group. The fabric covering of the toy, in other words of the group communication apparatus, can be fastenable in a detachable manner. An emblem 211 related to a group, such as the logo of a club, can be on the surface of the group communication apparatus. Alternatively there can be the name or initials of the club, and/or the colouring of the group communication apparatus is partially or completely similar to the colouring associated with the club. If the group communication apparatus belongs for example to a school group or day care centre group, the colouring and patterns of the surface can be designed by the members of the group. All apparatuses belonging to a group can have an individual visual appearance.

The group communication apparatus of FIG. 2*a* has the shape of a ball. In some alternatives the shape of the group communication apparatus is advantageously thinner so that it is easier to carry the group communication apparatus in a pocket. The group communication apparatus can be used as a key chain or as a toy fastened to a zipper, in which case the group communication apparatus also comprises a chain, wire, cord or similar, with which the group communication apparatus is fastenable to an item in a detachable manner. The group communication apparatus can also comprise terminals 213 for connecting external devices to the group communication apparatus or for connecting the group communication apparatus to the Internet. An external device can be a display for the viewing of image and video messages, a keyboard for the forming of a text-format message, or the external device can be a power source for the recharging of battery.

It is advantageous for the user interface of the group communication apparatus to be as simple as possible. The group communication apparatus can serve as a means of communication for the elderly or children, who may find it too difficult to use a modern mobile phone. The elderly or children can easily send a message by pressing the selection key of a subgroup and a sound recording key.

The group communication apparatus can consist of a body unit and of a visual unit, which visual unit is a cover fastenable in a detachable manner.

The group communication apparatus can consist of a body unit and of a visual unit, which visual unit is separate from the body. In some embodiments the visual unit is integrated into another item such as a garment.

It is advantageous that at least in some cases the body unit of the group communication apparatus is compatible with most visual units, in which case a user can join several groups by acquiring just the visual unit.

If the group communication apparatus has a separate visual unit or it has a cover fastenable in a detachable manner, the separate visual unit or cover includes a memory element that contains an identifier, and there is an information transmission connection between the visual unit and body unit for transmitting the identifier. The information transmission connection can be by wire or wireless, advantageously the connection is established automatically by connecting a cable between the units or by setting the visual unit close to the body unit in order to enable information transmission. The identifier of the visual unit is transmitted to the body unit, to a mobile phone or to the server.

The body unit includes electronics that take care at least of information transmission to a mobile communication device or to the Internet, and it can be universal, in other words different groups can use a similar body unit. The visual unit is individual for a group. The group followed can be changed by changing the visual unit that is in an information transmission connection with the body unit, or a connection to several groups can be made by setting the information transmission connection to the body unit with several visual units. The adding or changing of a group advantageously takes place automatically when an information transmission connection is established, without any measures required from a user. In some embodiments the visual unit comprises means for the encryption and decryption of information transmission, in which case safe information exchange between the server and the group communication apparatus or mobile communication device is enabled.

The holder of the apparatus may wish to join several groups. In this case, it is advantageous that the apparatus has two parts so that a user can change the visual unit of another group to the body unit. It is possible to use the body unit simultaneously with the visual unit of several different groups, in which case the messages of several groups are transmitted to the group communication apparatus.

A user can acquire several visual units to a group, with all visual units containing the same emblem. In this case, a user could attach and place visual units in several items such as a practice bag, clothing or car. A user would have a connection to a group even if the user did not carry the visual unit separately everywhere.

FIG. 2b shows in a block diagram an example of the potential composition of a group communication apparatus.

The group communication apparatus comprises a microcontroller 30, which arranges the execution of the commands and operation of the peripheral devices. The microcontroller can adjust the delay of a continuous sound feed or goal song. The adjustment can take place by a user or automatically. The delay can also be adjusted by means of a mobile communication device. The microcontroller can also take care of the control of illuminated items, or a separate LED controller 29 can take care of the control.

A memory 26 can be a separate component or arranged in connection with the microcontroller in the same microcircuit. The memory comprises at least a non-volatile unit, into which the identifier of the group communication apparatus has been saved. The memory can be an electromagnetically readable transponder, or tag. The identifier can be individual for the group communication apparatus. On the other hand, the identifier can be individual for a sports club. Furthermore, sports clubs can form a group for which the identifier is individual. As an example, all teams of the same ice hockey series level would form a group. The memory can also comprise a character string for encryption and decryption, with which character string information that is illegible to a machine or person is decrypted into a format legible to a machine or person. Encryption ensures that information sent from the system server is readable only in designated group communication apparatuses.

The purpose of a short-range radio 21 is to establish a connection to another group communication apparatus, transmit identifiers, commands and data with another group communication apparatus, and communicate with a mobile communication device. The short-range radio can operate for example in accordance with the Bluetooth, WLAN, IrDA or ZigBee standard. When the group communication apparatus has a connection with another group communication apparatus, an essential feature of the short-range radio is the length of its range. So that the resolution of the network formed by group communication apparatuses would be accurate, the range should be short. On the other hand, the range should be so long that the group communication apparatuses can detect each other. The range of the short-range radio is advantageously 5-100 metres. It is advantageous that the short-range radio notifies the intensity of a signal sent from another group communication apparatus and received in the short-range radio, and the sending group communication apparatus notifies the intensity of the sending signal, in which case the distance between the group communication apparatuses can be estimated from the attenuation of the signal received.

A long-range radio 22 arranges a connection to the system server. A long-range radio is not necessarily needed, if the connection is arranged by means of a short-range radio and an external mobile communication device. The long-range radio can operate for example in accordance with the GSM, 3G or 4G standard.

A sound element 23 converts an electric signal into an audible acoustic signal. The electric signal can play a goal song, sound message or be of a continuous sound feed. The D/A conversion is carried out in the sound element, microcontroller or by a separate microcircuit.

A microphone 22 converts an acoustic sound message, sound command or for example the sounds of a spectator stand into an electric signal. The A/D conversion is carried out either by a separate circuit or in the microcontroller. The electric signal is transmitted to the system server over the Internet. A signal interpreted as a message in the system server is saved in the database. A signal interpreted as a continuous feed is arranged in real time to a user of a group communication apparatus who has ordered the feed. A signal interpreted as a command executes the command in the system server. The system server can interpret match events from a continuous sound feed. As an example, a sudden change in sound intensity can be interpreted as the scoring of a goal. The microphone can also be used for identifying a user, in which case the group communication apparatus shifts from a locked mode to an active mode when it identifies the voice of a correct user. The group communication apparatus can start to play a goal song automatically, when the microphone hears the goal song in its environment, and advantageously the group communication apparatus becomes synchronised with the goal song it hears. According to a second alternative, the group communication apparatus or mobile communication device sends the goal song or a command to play the goal song to all recently detected group communication apparatuses of the same group so that the apparatuses repeat the goal song in a synchronised manner.

The group communication apparatus may comprise touch keys for the entering of commands. The controller 27 of the keys can be a separate circuit or part of the microcontroller. The group communication apparatus can also comprise equipment and software for the receiving of information and commands entered from an external wire keyboard or wireless keyboard. Alternative methods for giving commands include a push button, acceleration sensor 24 or sound recognition. An acceleration sensor converts the acceleration of the apparatus into an electric format. The group communication apparatus can interpret and modify the acceleration sensor data, and it can also transfer the acceleration sensor data to the database. An acceleration sensor can also be used for monitoring the activity of the use of the group communication apparatus.

Activity information can also be obtained by using a positioning device 28. The positioning device can be based on satellite positioning technology such as GPS. The positioning device can also be based on place information of base stations of a mobile phone network. The positioning device provides place information, which can be transmitted to the database. On the other hand, an application of a mobile communication device can use the positioning device of the mobile communication device and transmit the place information to the database. In some embodiment the group communication apparatus is set to independently react to certain place information. In some embodiment its operation is controlled from the system server based on place information.

The group communication apparatus can comprise an energy collector 31, which recharges a battery 25 by generating energy for example from the sun, motion, electromagnetic radiation, magnetic field or temperature difference.

A temperature sensor 32 can be used for estimating the location of a user. If a sudden change is detected in the measured temperature, it can be assumed that the group communication apparatus is moving. As an example, if the temperature decreases suddenly in the summer, it can be assumed that the group communication apparatus has entered an indoor ice rink.

In some embodiment the group communication apparatus can comprise a terminal and display adapter 33 for an external display so that text-based or graphics-based messages sent to the group communication apparatus can be viewed. The group communication apparatus can also comprise software and equipment for connecting the display to the group communication apparatus wirelessly. The group communication apparatus can also comprise software and equipment for connecting an external device that feeds or displays data, such as a computer, to the group communication apparatus.

The group communication apparatus can also comprise a camera, or the group communication apparatus comprises equipment and software for connecting an external camera, which camera can be used for taking image or video messages that the group communication apparatus transfers to the database.

The components of the group communication apparatus are placed on a circuit board located inside the group communication apparatus. Some components, such as the antenna, can be placed on the outer surface or inner surface of the surface material of the group communication apparatus.

FIG. 3 shows information 302 coming to 301 303 and going out of the database as well as information that the system server produces, and the purposes for which the information can be used.

A user A can transmit the following to the system server using the group communication apparatus 11b according to the invention, mobile communication device 11a or computer 15: a command, sound message, continuous sound feed, image-based information, video-based information, text-based information, identifiers of other group communication apparatuses detected, signal attenuation data to other group communication apparatuses, a user's own location information, motion sensor data and separately entered information on a user.

A message can be intended for a subgroup, which group comprises one or more recipients. Each user can be arranged subgroups in the database, with which subgroups a user's group communication apparatus communicates. A subgroup contains the identifier of those group communication apparatuses, to which a message is sent. When a group communication apparatus transmits a message to the system server, the group communication apparatus attaches information on the recipient group of a sound message. Continuous sound feed can be used for example for transmitting the atmosphere in the spectator stand. The sound feed can be recorded by a user of the group communication apparatus or by a club using an apparatus chosen. It is possible to transmit several sound feeds to the system server, and the listener of the feed can choose the feed of choice.

The group communication apparatus transmits the identifiers 312 detected by it to the database. The identifiers indicate which other group communication apparatuses are in the vicinity of the group communication apparatus. The detected identifiers 312 are saved in the information 313 of the user of each detecting and/or detected group communication apparatus. By collecting 315 and combining the identifiers of different users, it is possible to profile 314 a user of a group communication apparatus. As an example, it can be concluded how much a user participates in the activities of a club, what type of purchasing behaviour a user has, and in what issues is a user interested. The information transmission between the group communication apparatus and the system server can be managed by a mobile communication device other than its primary mobile communication device. The identifiers 310 of those mobile communication devices are saved in a user's information that can be used for communication between the system server and the group communication apparatus. In FIG. 3, the identifier of the user A's mobile communication device has been added to the user B's information after the user A's group communication apparatus detected the user B's group communication apparatus. If the user B does not have an own primary mobile communication device in use, the system server can arrange the user A's mobile communication device to communicate between the user B's group communication apparatus and the system server. A user can determine those group communication apparatuses where the user's own mobile communication device and the group communication apparatus serve as the transmitter.

The commands can be used for example for updating the match events of a junior match in the database in real time.

The following can be sent to the user B 302 to the group communication apparatus from the database: a sound message, continuous sound feed, image message, video message, text message or command. A continuous sound feed can be a continuous sound feed transmitted by another user or by a club to the database. A command can be a command to play a goal song, transfer to the active mode/power-saving mode, lighting of a light source to indicate the starting of a match, or lighting of a light source to indicate the score of a match. The system can generate a command automatically on the basis of schedule data.

An organisation can save for example the following information to a system server 303: statistics of match events, description of identifiers, schedule, continuous sound feed, sound message, image message, video message, text message and statistics.

Statistics of the match events can be compiled in the system server in real time or in retrospect. If statistics of a match event are compiled in real time and the match event is a goal scored by a club, the system generates a command to play a goal song. In addition to match events, a club can compile statistics of other events of the club such as practices, and especially of those who take part in practices.

The description of the identifiers includes a description of the identifiers of the group communication apparatuses that are in the possession of members or partners of the organisation. The description of the identifiers of the group communication apparatuses of members or partners of the organisation as well as the identifiers detected by their group communication apparatuses are utilised in the description of users. The group communication apparatuses of partners can be: at the sales points of the match venue, in a public or private facility favoured by the supporters of a club, in the practice facility of a club and in the possession of the coach of a club. At the sales points of the match venue and in the supporters' facilities, the group communication apparatus transmits to the database those who have visited and how long the visit of each person has lasted. A group communication apparatus located in the practice facility of a club identifies those who come to a practice.

A schedule includes the timing of the events of a club such as matches and practices. Based on schedules, the system server can send users reminders of the events or advertisements related to an event. A schedule can contain restrictions concerning the use of the apparatus in certain times; as an example, the sending and receiving of a message to a school pupil can be prevented during a lesson.

Continuous sound is sent for example as a commentary of an event. A sound message can be an interview or presentation of a player, or an advertisement of products or events. An organisation can create groups in the database, and the persons joining a group or joined to a group can listen to all messages of a group.

The database produces information 304 for a club, which information 304 has been saved in the database by a user. Such information includes a user's age, gender and place of residence. It is possible to save in the database concerning a customer's use of services available in the system server. Moreover, the system server produces additional information on the users by combining identifiers detected by a user's group communication apparatus, identifiers of a user collected by other users, information on other users and schedules of a club, place information saved in the database, and activity information from an acceleration sensor. The information collected can be used for example for concluding the scoring of a goal in real time, location of a user, where a user follows the matches, how often a user goes to see home or visit matches, how interested a user is in the affairs of a club, how much time a user spends with other supporters or how much a user communicates with other supporters, how the success of a team affects a user's behaviour, how much money a user spends in match events and how marketing affects a user's purchasing behaviour.

The place information 311 of a group communication apparatus can be declared to the database for example by a user. Some place information on a user such as home address, workplace address, address of the home indoor ice rink of a club and the address of a practice facility may have been saved in the database. The database can obtain information from other similar group communication apparatuses in the vicinity. The location of these other group communication apparatuses can be known, in which case the place information on a user is found out. The location of other similar group communication apparatuses is not necessarily known, but the location can be concluded by means of the database software. The place information can be used for implementing marketing bound to a place or for informing users of other users in the vicinity. Information sent by the acceleration sensor of a group communication apparatus to the database can also be used in the specification of the place of a group communication apparatus. As an example, if a group communication apparatus is moving during a match but not at the match venue and if the group communication apparatus detects other group communication apparatuses of the same group, then the holder is probably in a facility favoured by supporters, following the match. If a group communication apparatus is immobile during a match, it is likely at the holder's home.

In one embodiment the database can interpret match events from sudden sound changes and from the acceleration sensor data. A natural reaction of a supporter of a team to a positive turn of the team supported by the supporter, such as to a goal, is to stand up and shout spontaneously. If the sound signals recorded in a spectator stand intensify suddenly and/or if a sudden upward movement can be interpreted from the output signal of acceleration sensors, the system concludes that the team supported by holders of the group communication apparatus has scored a goal. The supporters of different teams have often been placed in different parts of the spectator stand. The information provided by the sensors can be integrated into this information. According to a second embodiment, the database learns to interpret the sound signal and acceleration signal, after which it teaches the group communication apparatus to interpret when the group communication apparatus can independently interpret the scoring of a goal from sound and acceleration. According to a third embodiment, the group communication apparatus teaches itself to interpret the scoring of a goal from sound and acceleration. The scoring of a goal can be interpreted especially from a goal song recorded in the spectator stand. If the group communication apparatus interprets itself that a goal has been scored, it can play a goal song without a command coming from the system server.

The group communication apparatus plays the support song of a club, an anthem or a sound symbol selected or made by a user when a significant event takes place in a match of a club. A significant event can be for example a goal in football, a basket in basketball or a point in volleyball. A significant event can also be a punishment of the team of the club or a punishment of the opponent. In this case, the group communication apparatus can play a different predetermined symbol. The sound symbols can be transferred and saved in the memory 26 of the group communication apparatus in advance, in which case the system server sends a command to the group communication apparatus to play a symbol. Furthermore, the sound symbols can be transferred and saved in the memory of a mobile communication device in advance, in which case the system server reacts to a match event by sending a command to the mobile communication device to play a symbol, and the symbol is transferred from the mobile communication device to the group communication apparatus to be played. A sound symbol can also be saved in the database, in which case, when a significant match event has taken place, the symbol is transferred to the group communication apparatus to be played. The group communication apparatus can also react to match events by producing light when a significant match event takes place.

Sounds in the spectator stand of a sporting event are recorded by means of group communication apparatuses carried by spectators at the sporting event. There can be several spectators, in which case sounds are obtained from different parts of the spectator stand. Recordings made in different parts of the spectator stand can be arranged into their own sound channels. Sounds in the spectator stand can be recorded alternatively by means of an ordinary microphone, which has been directed to record sounds in the spectator stand. The group communication apparatus can also be used for recording other sounds of the match event, such as the sounds of the ball being kicked, the coach's voice, cheer from the fan stand or the commentator's voice. The recorded sound is transmitted to the system server. Several sound channels have been recorded in the database as separate sound channels, or they have been combined in a manner that can be disassembled at the receiving end. The sound channels of several different group communication apparatuses can be combined so that a conversation conducted in the vicinity of an individual group communication apparatus or other interference does not stand out from the final sound feed and so that the combined channel only transmits the atmosphere of the spectator stand. A user following a match at home can take into use the sound channels that a user wishes to choose. A user has a chance to create a realistic atmosphere of a sporting event by using several group communication apparatuses according to the invention and to use them to repeat the sound recorded in the different parts of the spectator stand.

FIG. 4 shows a flow chart example of the use of the group communication apparatus and system to assist the organiser of an event. The event can be for example a tournament of junior athletes, where voluntary assistants are needed. These voluntary assistants can be guardians of the junior athletes, with the guardians carrying a group communication apparatus according to the invention at the event venue. In FIG. 4, the touching/pressing of some command key 214 of the group communication apparatus of a person requesting assistance has been set in the system server to be interpreted as a request for assistance 402. In addition to the command, the person requesting assistance sends a voice message, which contains instructions to the person receiving the request for assistance. A list of potential assistants 403 has been arranged in the database in advance. The potential assistants 403 can be guardians of the junior athletes. At the event venue, the group communication apparatus of the club reads the identifiers of the group communication apparatuses of those who are present, and the identifiers are transmitted to the system server and saved in the database 404.

The system server compares those present to the group of potential assistants fed into the database in advance 408. The result of the comparison are the potential assistants at the event venue, and the potential assistants are saved in the database 409. After a request for assistance received at the system server, the system server transmits the request for assistance to the assistants present 410. Alternatively, those present in an event can be concluded without a group communication apparatus of the club as follows:

several group communication apparatuses belonging to the same group or subgroup detect each other and send to the system server the identifiers of the group communication apparatuses belonging to the same group or subgroup and located in their vicinity 405, the system server concludes that an event of the group has started and that the holders of the apparatuses are at the event venue 406, the system server can use the schedule information related to the group and saved in the database and/or the information of the positioning devices of the group communication apparatuses.

The system server compares those present to the group of potential assistants fed into the database in advance 408. The result of the comparison are the potential assistants at the event venue, and the potential assistants are saved in the database 409. After a request for assistance received at the system server, the system server transmits the request for assistance to the assistants present 410. Alternatively, those present in an event can be concluded without a group communication apparatus of the club as follows:

several group communication apparatuses belonging to the same group or subgroup detect each other and send to the system server the identifiers of the group communication apparatuses belonging to the same group or subgroup and located in their vicinity 405, the system server concludes that an event of the group has started and that the holders of the apparatuses are at the event venue 406, the system server can use the schedule information related to the group and saved in the database and/or the information of the positioning devices of the group communication apparatuses.

The system server compares those present to the group of potential assistants fed into the database in advance 408. The result of the comparison are the potential assistants at the event venue, and the potential assistants are saved in the database 409. After a request for assistance received at the system server, the system server transmits the request for assistance to the assistants present 410. Alternatively, those present in an event can be concluded without a group communication apparatus of the club as follows:

several group communication apparatuses belonging to the same group or subgroup detect each other and send to the system server the identifiers of the group communication apparatuses belonging to the same group or subgroup and located in their vicinity 405, the system server concludes that an event of the group has started and that the holders of the apparatuses are at the event venue 406, the system server can use the schedule information related to the group and saved in the database and/or the information of the positioning devices of the group communication apparatuses. The more exact location of a user can be concluded in some cases from the intensity of the signal to another group communication apparatus. An embodiment of such a case is presented in FIG. 6. The information of a group communication apparatus 601 located at a sales point at a sports stadium has been saved in the database. The information indicates for example what is for sale at the sales point. The group communication apparatus located at the sales point at the sports stadium detects group communication apparatuses 603, 604 and 605. The intensity of the signal of the detected group communication apparatus 603 is great and it has been detected for a length of time in the vicinity of the sales point, so the system server interprets that the holder of the group communication apparatus is at the sales point as a customer. The group communication apparatus 604 has also been detected for a length of time, but the intensity of its signal is smaller, so the system server interprets that its holder is at an adjacent sales point. The intensity of the signal of the detected group communication apparatus 605 increased and decreased suddenly, so the system server interpreted that its holder walked past the sales point.

The group communication apparatus can be used for the supervision of a group, especially for supervising that the group stays together. The group can be for example a day care centre group on an outing, with each child carrying a group communication apparatus. The group communication apparatus of at least the person supervising the group advantageously has a connection to the database. In the initial situation, the group communication apparatus or mobile communication device of the supervising person saves in its own memory and/or in the database the identifiers of all the group communication apparatuses belonging to the same group and detected by the group communication apparatus or mobile communication device. When the group communication apparatus of a supervised person gets farther away from the supervising person, the intensity of the signal of the short-range radio decreases. When the intensity of the signal decreases below a certain limit value, the group communication apparatus or mobile communication device of the supervising person generates an alarm independently. Alternatively, the alarm decision is made by the system server, and the alarm is directed to the supervising person to the group communication apparatus or mobile communication device. The group communication apparatus of the person getting farther away can also generate an alarm, either independently or by a command from the system server. The alarm can be a sound message or a light signal. In one embodiment the group communication apparatuses supervised also inquire each other's identifiers and obtain information on the intensity of each other's communication signals. The information on the intensity of the communication signals is compiled in the group communication apparatus of the supervising person and/or in the database, and the compiled information can be used for finding out the relative location of the group communication apparatuses with regard to each other. This reveals information on the most recent movements and location of the person getting farther away before the person got farther away. Supervising group communication apparatuses can be placed in the yard area of a day care centre, in which case the system generates an alarm if the supervising group communication apparatuses do not detect all children. Supervising group communication apparatuses can be placed outside the permitted area, in which case the system generates an alarm when a group communication apparatus outside the permitted area detects the group communication apparatus of a child.

Because the group communication apparatus can have an individual identifier and because the group communication apparatus has been arranged to notify its own identifier to another group communication apparatus inquiring it, the group communication apparatus can be used in connection with a payment. A payment can be made by means of the group communication apparatus or an identifier can be included in the group communication apparatus to affect a price reduction or other terms of transaction. The identifier of the group communication apparatus can also be used for enabling access to the facilities of a group, or the group communication apparatus can replace the membership card of a club. The security of the payment can be enhanced by using a very short-range radio such as the NFC protocol or by decreasing the intensity of the signal of the short-range radio.

The group communication apparatus can also be used by an entrepreneur who informs customers of his products and services. Such an entrepreneur is advantageously a seller of perishable goods, who must sell the perishable goods or goods or services with a limited period of availability quickly to the customers. In this case, the group communication apparatus advantageously has the emblem of the entrepreneur's company. According to a second aspect, an entrepreneur can use the group communication apparatus to offer subsequent maintenance and customer services, operating instructions, printout files of spare parts, updates and new products to a customer who has already bought a product or service. When a customer makes contact using a group communication apparatus, the entrepreneur obtains the necessary information on the customer and on the products bought by the customer from the identifier of the group communication apparatus. According to a third aspect, an entrepreneur can use the group communication apparatus to offer potential customers access to the entrepreneur's closed database, where a product is presented comprehensively. Based on the behaviour of a potential customer, the entrepreneur can learn which information is important to the potential customer and which information affects the purchase decision.

The system can identify foreign supporters of a sports club. The group communication apparatus can be used for directing advertising to them concerning companies that provide accommodation services in the home town of the club.

A person interested in some topic can compile for example image, sound, video and text information on the topic to the server and get a reward for the work done by selling customers the right to use the information. Access to the information located in the system server would take place by means of a group communication apparatus that contains the visual unit of the group, which visual unit contains the identifier associated with the group. Since the information in the server is only accessible by a group communication apparatus having the correct identifier, A group composed of boaters can exchange information on available places in a visitors' marina. By utilising place information, the system server can estimate the usage degree of the marina, or the system server can conclude from the place information who are at the marina in question. The system server can also allocate communication between those already at the marina and those potentially coming there.

If so desired, the server can deliver the information only to a group communication apparatus that has the right identifier, so the holder can determine.

In order to minimise the manufacturing costs, the body unit is advantageously uniform with several groups. In order to minimise the manufacturing costs, the customer of the group communication apparatus should be able to design the visual unit. The design of the visual unit can take place by means of software located in the server or by means of the customer's own software. The design of the visual unit can be based on a photograph or some other image file or files, to which image the customer adds the potential keys as drawing elements. In the manufacturing stage, the identifier is transferred to the visual unit to individualise it.

In what follows, characterising descriptions are presented of group communication apparatuses, surface materials, system services and group communication methods according to some embodiments of the invention.

According to a first characterisation, a group communication apparatus that is intended for wireless communication between communication apparatuses belonging to a group (180), where the communication takes place via a system server (19) that has a connection to the Internet, comprises:
   an identifier, which identifier is individual for the group communication apparatus or group and which identifier enables information transmission between the system server and the group communication apparatus,
   a radio unit (22), which radio unit comprises equipment for establishing a wireless Internet connection or which radio unit comprises equipment for establishing a wireless connection with a mobile communication device (11a) or with a communication device (15) bound to a place, which mobile communication device or communication device bound to a place has a connection to the Internet, and which radio unit has been arranged to transmit the identifier of the group communication apparatus to a database, mobile communication device or communication device bound to a place, which database determines the group communication apparatuses belonging to a group, and where
   the colouring or design of the group communication apparatus is at least partially characteristic of the group, advantageously its design resembles sporting equipment or the emblem or mascot of a club, and/or the surface material of which group communication apparatus comprises the logo (211) of the club, and
   the information transmitted to the group communication apparatus is characteristic of the group and the context of the information transmitted is disclosed by the external appearance of the apparatus.

According to a second characterisation, a group communication apparatus that is intended for wireless communication between communication apparatuses belonging to a group (180), where the communication takes place via a system server (19) that has a connection to the Internet, comprises:

an identifier, which identifier is individual for the group communication apparatus or group and which identifier enables information transmission between the system server and the group communication apparatus, a radio unit (22), which radio unit comprises equipment for establishing a wireless Internet connection or which radio unit comprises equipment for establishing a wireless connection with a mobile communication device (11a) or with a communication device (15) bound to a place, which mobile communication device or communication device bound to a place has a connection to the Internet, and which radio unit has been arranged to transmit the identifier of the group communication apparatus to a database, mobile communication device or communication device bound to a place, which database determines the group communication apparatuses belonging to a group, characterised in that the colouring or design of the group communication apparatus is at least partially characteristic of the group, advantageously its design resembles sporting equipment or the emblem or mascot of a club, and/or the surface material of which group communication apparatus comprises the logo (211) of the club, and that the radio unit further comprises equipment for establishing a wireless short-range connection to another group communication apparatus (21), and which radio unit has been arranged to inquire and/or receive the identifier of another group communication apparatus, and which radio unit transmits the identifiers of the other group communication apparatuses detected by it to the database over the Internet or which radio unit transmits the identifiers of the other group communication apparatuses detected by it to a mobile communication device.

According to a third characterisation, a group communication apparatus that is intended for wireless communication between communication apparatuses belonging to a group (180), where the communication takes place via a system server (19) that has a connection to the Internet, comprises at least two units, a body unit and a visual unit, where the body unit comprises:

a radio unit (22), which radio unit comprises equipment for establishing a wireless Internet connection or which radio unit comprises equipment for establishing a wireless connection with a mobile communication device (11a) or with a communication device (15) bound to a place, which mobile communication device or communication device bound to a place has a connection to the Internet, and which radio unit has been arranged to transmit the identifier of the group communication apparatus to a database, mobile communication device or communication device bound to a place, which database determines the group communication apparatuses belonging to a group, and where the visual unit of the group communication apparatus:

comprises a memory element (26), into which memory element an identifier has been saved, which identifier is individual for the group communication apparatus or group and which identifier enables information transmission between the system server and the group communication apparatus, and has at least partially the colouring or design characteristic of the group, advantageously its design resembles sporting equipment or the emblem or mascot of a club, and/or the surface material of which group communication apparatus comprises the logo (211) of the club, and between the visual unit and body unit of which group communication apparatus there is an information transmission connection for reading the identifier and the visual unit of which group communication apparatus is fastenable to the body part in a detachable manner or the visual unit of which group communication apparatus is physically separate from the body part.

According to a fourth characterisation, a group communication apparatus according to any one of the characterisations 1-3 comprises:

equipment for producing sound or equipment for establishing a connection to a device producing sound, and equipment for converting sound into an electric signal or equipment for establishing a connection to a device that converts sound into an electric signal.

A group communication apparatus according to any one of the characterisations 1-4, where the sound-producing element produces a sound symbol essentially in real time when a positive turn takes place for a group, for example a goal, and the sound symbol is most advantageously a goal song of a team, part of a support song or other sound symbol associated with the success of the team and saved in the database, mobile communication device or group communication apparatus.

A group communication apparatus according to any one of the characterisations 1-3, which group communication apparatus has equipment, which:

is capable of transmitting information between the system server and another group communication apparatus belonging to a group, and/or is capable of communicating with another group communication apparatus belonging to a group without the system server if they are within the operating range of a short-range radio.

A group communication apparatus according to any one of the characterisations 1-3, where the colouring or design of the group communication apparatus has been designed individually for the group or group communication apparatus.

A group communication apparatus according to any one of the characterisations 1-3, where the transmission of the identifier to the system server and identification into the group are executed autonomously.

A group communication apparatus according to any one of the characterisations 1-3, where the visual unit contains at least one key that controls the operation of the system server.

According to a fifth characterisation, a surface material is accomplished for the group communication apparatus, which group communication apparatus is intended for wireless communication between communication apparatuses belonging to a group, where the communication takes place via a database that has a connection to the Internet, and which group communication apparatus comprises:

a memory element (26), into which memory element an identifier has been saved, which identifier is individual for the group communication apparatus or individual for the group, a radio unit (22), which radio unit comprises equipment for establishing a wireless Internet connection or which radio unit comprises equipment for establishing a wireless connection with a mobile communication device, which mobile communication device has a connection to the Internet, and which radio unit has been arranged to transmit the identifier of the group communication apparatus to a database, which database determines the group communication apparatuses belonging to a group, and a sound-producing element (23), the surface material here is of fabric and is fastenable in a detachable manner, and the visual appearance of the surface material is individual for the group communication apparatus or group, and the surface material comprises an identifier for the individualisation of the group communication apparatus or for identifying into the group.

A surface material of a group communication apparatus according to characterisation 5, where the surface material comprises a memory element, into which memory element an identifier has been saved, which identifier is individual for the group communication apparatus or group.

According to characterisation 6, a system server is accomplished, into which system server an identifier is transmitted from a terminal apparatus or from a mobile communication device which has a connection to the terminal apparatus, which identifier is individual for the terminal apparatus or for a group formed of terminal apparatuses, which system server transmits information validated with the identifier to a terminal apparatus corresponding to the identifier, in which the terminal apparatus has a visual appearance characteristic of the group, advantageously its design resembles sporting equipment or the emblem or mascot of a club, and/or the surface material of which group communication apparatus comprises the logo (211) of the club, and the information transmitted to the terminal apparatus is characteristic of the group and the context of the information transmitted is disclosed by the external appearance of the apparatus.

A system server according to characterisation 6, which system server has been arranged to identify a group communication apparatus, the colouring or design of which has been designed individually for the group or group communication apparatus.

A system server according to characterisation 6, which system server has been arranged to receive information produced to the server by terminal apparatuses belonging to a group, and the information in the server can be read without separate log-in.

A system server according to characterisation 6, which system server comprises communication equipment, with which an identifier can be transmitted from a terminal apparatus or from a mobile communication device which has a connection to the terminal apparatus to the system server autonomously.

A system server according to characterisation 6, which system server comprises communication equipment, with which the system server saves in the database the identifiers detected by the short-range radio of the terminal apparatus.

A system according to any one of the above characterisations, where the visually identifiable identifier unit of the group communication apparatus comprises a memory element, into which memory element an identifier has been saved, which identifier is individual for the group communication apparatus or group and which identifier enables information transmission between the system server and the group communication apparatus.

According to characterisation 7, a group communication method is accomplished, in which method a group communication apparatus is used, which group communication apparatus is intended for wireless communication between communication apparatuses belonging to a group (180), where the communication takes place via a system server (19) that has a connection to the Internet and in which method a group communication apparatus is used, which comprises:

a memory element (26), into which memory element an identifier has been saved, which identifier is individual for the group communication apparatus or group, a radio unit (22), which radio unit comprises equipment for establishing a wireless Internet connection or which radio unit comprises equipment for establishing a wireless connection with a mobile communication device (11a) or with a communication device (15) bound to a place, which mobile communication device or communication device bound to a place has a connection to the Internet, and which radio unit has been arranged to transmit the identifier of the group communication apparatus to a database, mobile communication device or communication device bound to a place, which database determines the group communication apparatuses belonging to a group, which radio unit further comprises equipment for establishing a wireless short-range connection to another group communication apparatus (21), and which radio unit has been arranged to inquire and/or receive the identifier of another group communication apparatus, and a sound-producing element (23), in the first stage of the method the identifiers of those group communication apparatuses belonging to a group that are intended to be monitored are saved in the system server, mobile communication device or group communication apparatus, and the inquiry of the identifiers of the group communication apparatuses is started using the short-range radio, and in the second stage of the method the mobile communication device or group communication apparatus has been arranged to notify if:

just one of the identifiers saved in the first stage is missing, or the intensity of the signal of just one radio unit decreases below a predetermined limit value, or a group communication apparatus detects an identifier belonging to a group, which identifier has not been saved in the first stage of the method.

Many of the embodiments of the invention can be implemented by means of a mobile communication device. In what follows, an example apparatus is described, with which example apparatus it is possible to implement at least some of the embodiments of the invention. The figure shows an apparatus 600, which can comprise for example a mobile communication device such as a mobile phone. The apparatus 600 comprises a processor 610, which can comprise for example a single-core or multi-core processor, where a single-core processor comprises one processor core and a multi-core processor comprises more than one processor core. The processor 610 can comprise more than one processor. The processor core can comprise for example a Cortex-A8 processor core manufactured by ARM Holdings or a Steamroller processor core manufactured by Advanced Micro Devices Corporation. The processor 610 can comprise at least one Qualcomm Snapdragon and/or Intel Atom processor. The processor 610 can comprise at least one application-specific integrated circuit, ASIC. The processor can comprise at least one field-programmable gate array, FPGA. The processor 610 can be a means for implementing method steps in the apparatus 300. The processor 610 can be configured to execute functions at least partially in a programmatic manner.

The apparatus 600 can comprise a memory 620. The memory 620 can comprise a random access memory (RAM) and/or read-only memory. The memory 620 can comprise at least one RAM chip. The memory can comprise for example a fixed, magnetic, optical and/or holographic memory. The memory 620 can be at least partially available to the processor 610. The memory 620 can be at least partially integrated into the processor 610. The memory can be a device for saving information. The memory can comprise program commands, which the processor 610 is configured to execute. When the program commands, which have been configured to make the processor execute certain functions, have been saved in the memory 620, the apparatus has in general been configured to operate in accordance with the instructions of the processor 610 using the program commands from the memory 620, the processor 610 and at least one of its processor core are understood to have been configured to execute these certain functions. The memory 620 can be at least partially integrated into the processor 610. The memory can be at least partially external to the apparatus 600 but attainable by the apparatus 600.

The apparatus 600 can comprise a transmitter 630. The apparatus 600 can comprise a receiver 640. The transmitter 630 and receiver 640 can be configured to send and receive, respectively, information in accordance with at least one mobile communication device standard or standard other than a mobile communication device standard. The transmitter 630 can comprise more than one transmitter. The receiver 640 can comprise more than one receiver. The transmitter 639 and/or receiver 640 can be configured to operate for example in accordance with standards global system for mobile communication, GSM, wideband code division multiple access, WCDMA, long term evolution, LTE, IS-95, wireless local area network, WLAN, Ethernet and/or worldwide interoperability for microwave access, WiMAX.

The apparatus 600 can comprise a transmitter-receiver of a Near Field Communication device, NFC. The NFC transmitter-receiver can use at least one NFC technology such as Bluetooth, Wibree or similar.

The apparatus 600 can comprise a user interface, UI, 660. UI 660 can comprise at least one of the following: a display, keyboard, touch display, vibrator device, which has been arranged to a give a signal to a user by making the apparatus 600 vibrate, loudspeaker and microphone. A user can use the apparatus via the user interface UI 660 for example to accept incoming telephone calls, establish telephone calls or video messages, browse the Internet, manage digital files saved in the memory 620 or digital files available through a cloud service via the transmitter 630 and receiver 640 or via the NFC transmitter-receiver 650, and/or to play games.

The apparatus 600 can be arranged to accept a user-identifying module 670. The user-identifying module can be for example a Subscriber Identity Module SIM card, which can be installed in the apparatus. The user-identifying module 670 can comprise information that identifies a user's account to the apparatus 600. The user-identifying module 670 can comprise encrypted information that can be used to verify the user of the apparatus 600 and/or to enable the encryption of the transmitted information and the invoicing of the user of the apparatus 600 concerning the information transmission taking place on the apparatus 300.

The processor 610 can be equipped with a transmitter for transmitting information from the processor 610 along electric conductors located inside the apparatus 600 to the other devices in the apparatus 600. Such a transmitter can comprise a serial bus transmitter, which has been arranged for example to send information at least via one electric conductor to the memory 620 to be stored there. Alternatively, instead of a serial bus the transmitter can comprise a parallel bus transmitter. Similarly, the processor can comprise a receiver for receiving information to the processor 610 along electric conductors located inside the apparatus 600 from the other devices in the apparatus 600. Such a receiver can comprise a serial bus receiver, which has been arranged for example to receive information via at least one electric conductor coming from the receiver 640 to the processor 610 to be processed there. Alternatively, instead of a serial bus the transmitter can comprise a parallel bus transmitter.

The apparatus as described above can be used for the implementation of the invention, or various embodiments of the invention can be implemented by means if its individual parts or functions in accordance with the above description.

INDUSTRIAL USABILITY

Communication apparatuses and communication methods for various purposes can be implemented by means of at least some embodiments of the invention.

The invention claimed is:

1. A group messaging device, comprising:
a radio unit, configured to be wirelessly connectable to a network,
at least one visually distinguishable identifier unit comprising a touch sensitive element for controlling the group messaging device and at least one of the following:
shapes,
colors,
a logo,
a likeness of a sporting equipment,
a likeness of a team mascot, and
wherein the identifier unit is configured to allow rapid visual identification of at least one group the group messaging device belongs to, and wherein the radio unit is configured to communicate with at least one system server, comprising:
a database comprising at least one group of group messaging devices; wherein the combination of the at least one visually distinguishable identifier unit and the group messaging device is used at least in part to derive an identifier, and, using the identifier, the group messaging device can communicate with a group of devices determined by the visual identifier at least via a device serving as a system server.

2. The group messaging device of claim 1, wherein the visually distinguishable identifier unit is connected to the radio unit by a wireless connection.

3. The group messaging device of claim 1, wherein the visually distinguishable identifier unit is physically detachable from the radio unit.

4. The group messaging device of claim 1, wherein the group messaging device is constructed out of fabric.

5. The group messaging device of claim 1, wherein the group messaging device comprises at least one audio element and the system is configured to instruct a group of messaging devices to pro duce a specific audio response when an event occurs.

6. The group messaging device of claim 1, wherein the visually distinguishable identifier unit is individual to a single group messaging device.

7. The group messaging device of claim 1, wherein the visually distinguishable identifier unit designates a group of 5 group messaging devices.

\* \* \* \* \*